Mar. 6, 1923.

E. J. WATTS.
PEN FOR RECORDING INSTRUMENTS.
FILED JUNE 28, 1920.

1,447,582.

Inventor:
Edward J. Watts,
by Emery, Booth, Janney & Varney
Attys

Patented Mar. 6, 1923.

1,447,582

UNITED STATES PATENT OFFICE.

EDWARD J. WATTS, OF FOXBORO, MASSACHUSETTS, ASSIGNOR TO THE FOXBORO COMPANY, OF FOXBORO, MASSACHUSETTS, A CORPORATION OF MASSACHUSETTS.

PEN FOR RECORDING INSTRUMENTS.

Application filed June 28, 1920. Serial No. 392,221.

*To all whom it may concern:*

Be it known that I, EDWARD J. WATTS, a citizen of the United States, and a resident of Foxboro, county of Norfolk, and State of Massachusetts, have invented an Improvement in Pens for Recording Instruments, of which the following description, in connection with the accompanying drawings, is a specification, like characters on the drawings representing like parts.

This invention relates to pens and more particularly to a pen adapted for use on a recording instrument such as a pressure gage.

My invention will be clearly understood from the following description of a single specific embodiment thereof shown by way of example in the accompanying drawings wherein.

Figure 1:
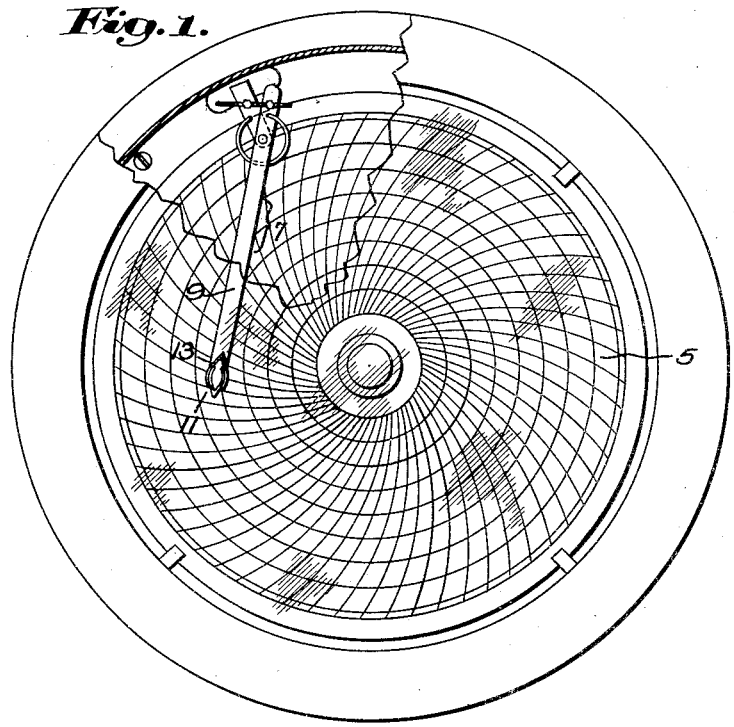
Fig. 1 is a front elevation of a recording instrument utilizing a form of pen embodying my invention.

Referring to Fig. 1, I have there shown a recording instrument having a rotary dial or chart 5 and pivoted at one side of the dial a marking instrument or pen 7 adapted to swing between the center of the chart and the edge thereof as the conditions to be measured vary. The marker herein shown comprises the flexible hand or support 9 yieldable transversely of the plane of the chart 5 and which carries at its outer end the pen proper 11. Conveniently the hand is provided with ears 13 clasping and supporting the pen 11 at right angles to the body of the hand and permitting the pen proper 11 to be slid in and out of position.

Figure 2:
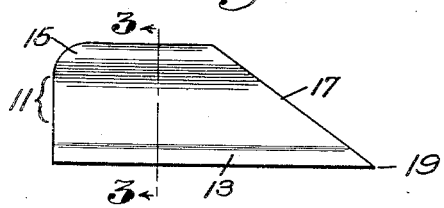
Fig. 2 is a side elevation of the pen proper.
Figure 3:
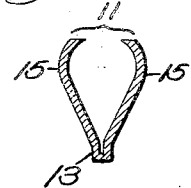
Fig. 3 is a section on the line 3—3 of Fig. 2.

In the form of my invention here shown the pen 11 is formed from a single piece of sheet metal and may have a generally V-shaped section as shown in Fig. 3. The bottom of the V is crimped to provide a capillary channel 13 from the flanges of which arise the wing portions 15 constituting an ink-receiving reservoir adapted to receive and hold a drop of ink. As shown in Fig. 2, the body of the pen may be bevelled off at 17 from the wings to the bottom of the channel, thus providing at one extremity of the latter a unitary marking point 19 formed essentially by the web of the channel 13 but backed and supported by the bevelled flanges thereof and the bevelled portions of the wings 15.

The pen is assembled with the hand 9 or other holder in such a manner as to occupy substantially the positions of Figs. 2 and 3 with the point 19 resting against the surface to be marked. Ink is fed along the capillary channel 13 to the point and a large drop or supply of ink may be retained between the wings 15 remote from the point and this reservoir of ink will drain directly under gravity to the feeding duct 13 which is below the level of the same. In fact, the ink directly settles into and fills the duct 13 and the bevelled edges of the wings 17 assist in feeding the ink towards the marking point 19, the construction being such, however, that a large drop of ink which might form a blot will not pass to the pen point as the extremity of the pen adjacent the point 19 consists of a capillary duct only and the flow of ink toward the point is also restricted by the lowering of the wing portions 15 along the bevel 17. At the same time a free and ready supply of ink to the point for marking purposes is assured.

Having thus described in detail the particular embodiment of my invention shown for illustrative purposes in the accompanying drawings, the principles exemplified thereby which I claim as new and desire to secure by Letters Patent I shall express in the following claims.

Claims—

1. A pen comprising a capillary channel bevelled to provide a unitary point and having wing portions rising from the flanges of the channel and providing an ink-receiving reservoir.

2. A pen comprising a sheet metal body crimped to form a capillary channel having an end providing a marking point and having remote from the point wings providing an ink-receiving reservoir.

3. A pen having a body of general V section closely crimped at the bottom to provide a capillary channel and having diverging wings at an acute angle, the whole being bevelled to provide a point at the extremity of the channel.

In testimony whereof, I have signed my name to this specification.

EDWARD J. WATTS.